Sept. 14, 1965  H. J. TIFFANY, JR  3,206,040
PRESS UNLOADER
Filed April 30, 1962  5 Sheets-Sheet 1

FIG. 1.

INVENTOR.
Harry J. Tiffany, Jr.
BY
Harness, Dickey & Pierce
ATTORNEYS.

United States Patent Office 3,206,040
Patented Sept. 14, 1965

3,206,040
PRESS UNLOADER
Harry J. Tiffany, Jr., Rochester, Mich., assignor to Sahlin Engineering Company, Inc., Birmingham, Mich., a corporation of Michigan
Filed Apr. 30, 1962, Ser. No. 190,902
17 Claims. (Cl. 214—1)

This invention relates to the art of material handling and more particularly to press unloading apparatus.

In general, the apparatus of this invention is designed for use as a workpiece unloading devices to remove sheet metal stampings such as automobile body panels from stamping presses. However, the apparatus may also be used in other environments and for other purposes such as transferring workpieces between spaced work stations, loading presses, and other related tasks.

Press unloading equipment of the type to which this invention relates conventionally includes a frame fixedly mounted relative to a press, a swingable arm which is adjustable in length, jaw means mounted on and carried by the swingable arm, and control means to cause movement of the swingable arm and jaw means along a predetermined path which begins at a workpiece pickup point adjacent the press and terminates at or beyond a workpiece release or drop-off point spaced outwardly and upwardly relative to the pickup point. Varying paths of movement between varying pickup points and release points have been previously obtainable by adjusting the length of the swingable jaw supporting arm and the angle of approach of the jaw means carried thereby. However, until the present invention, no adequate means have been known to provide a plurality of varying paths of movement from a particular pickup point so that varying panel configurations and press structure can readily be accommodated by a single piece of equipment.

In the present invention, a movable support arm is provided for moving jaw means between a retracted position located adjacent the confines of a press with which it is associated whereat gripping engagement with a workpiece located therein may be obtained and an extended position located upwardly and outwardly therefrom. The jaw means is operable in the retracted position from an open position to a closed position to clampingly engage the workpiece within the press for removal therefrom. The jaw means is additionally operable from the closed clamping position to an open release position to release the workpiece during movement of the support arm from the retracted position to the extended position. The jaw means is operable to the release position at a predetermined location of the support arm during movement between the retracted and the extended positions to deposit the workpiece in a predetermined manner relative to workpiece receiving means located therebeneath. The movable support arm means is conventionally operable in response to the position of the press with which it is associated. The support arm may be directly actuated by press movement or indirectly actuated through suitable controls associated therewith. A cam track is provided to guide movement of the support arm along a path which extends upwardly and outwardly relative to the press. Adjustment means are associated with the support arm and the cam track to provide variable paths of movement of the jaw means from a single pickup point without adjustment of the length of the support arm or repositioning of the frame which supports the movable arm.

The principle object of the present invention is to provide improved support arm means for a material handling device operable in varying paths of movement.

Another object of the present invention is to provide a movable support arm for a material handling device which is guided along a cam track positioned so that all parts of the support arm move outwardly away from the press and so that a minimum power expenditure is required in operation.

Still another object of the present invention is to provide press unloading apparatus with which workpieces may be removed from a press in an improved path of movement. In this regard, an object is to provide for varying paths of movement including variable initial vertical displacement from a single workpiece pickup point and terminal horizontal displacement to a workpiece release point without excessive intermediate dip below the pickup point.

A further object of the present invention is to provide a material handling device which is capable of use for transferring heavier loads than previous apparatus.

Another object of the present invention is to provide a material handling device which is movable between a retracted position and an extended position relative to an associated press in an improved manner, and which may be provided with a positive load-bearing support at the termination of movement between the positions.

Still another object is to provide material handling apparatus which is movable during a portion of its operation in response to the effect of gravity in a controlled manner under the influence of energy storage means conditioned during a power stroke of the apparatus.

The objects and many of the advantages of the present invention will be more thoroughly understood by those skilled in the art to which this invention relates by reference to the following detailed description and accompanying drawing wherein:

Referring now to the drawings, movable jaw support means and associated control means are mounted on a frame formed from spaced vertical side plates 10, 12, top and bottom plates 14, 16, and a pair of cross-brace members 18, 20. The frame is adapted to be fixedly secured to a portion 22 of a press or a bracket associated therewith by means of hooks 24, 26 which are secured to the cross-brace 18 and have downwardly opening slots 28 formed in the lower ends thereof. The slots 28 are adapted to receive upwardly extending retaining flanges 30, 32 provided on the press portion 22 and have tapered rounded corners 34 to facilitate association therewith. A vertical line intersecting the hook and slot connection is commonly referred to as the hook line and will hereinafter be discussed in greater detail. A plurality of suitable fastening devices 36 are provided to secure the frame to the press portion 22 through the cross-brace 20. A quick and convenient method of associating and disassociating the material handling unit with the press is thereby provided. A crane or overhead hoist may be utilized to lift the unit and locate the hooks over the retaining flanges 30, 32. The bolt means 36 may be thereafter fastened to the press portion 22 to securely retain the unit in place. Similarly, disassociation of the unit from the press is simply accomplished by loosening the bolt means 36 and lifting the unit off of the retaining flanges 30, 32.

Guide means for controlling the path of movement of a movable jaw supporting arm means is provided by a pair of parallelly curved and aligned guide slots 40, 42. Each of the guide slots are identically constructed and therefore only the guide slot 40 is hereinafter described in detail. Each guide slot is formed by parallelly extending cam surfaces 44, 46 formed on plate members 48, 50 which are suitably secured to the frame and extend upwardly and outwardly relative to the press portion 22. Each slot comprises lower substantially vertically extending portions 52 and upper substantially horizontally extending portions 54 which are interconnected by curved portions 56, 58 of varying radii to form a continuous smooth curve tangentially connecting each of the straight portions 52, 54. The radius of curvature of the curved portion 56 is substantially greater than the radius of curvature of the curved portion 58. The slope of the curved portion 56 provides substantially longer vertical increments of movement relative to horizontal increments of movement of a point traveling along the curved surface. Contrariwise, the curved portion 58 provides substantially longer horizontal increments of movement relative to vertical increments of movement of a point moving along the curved surface.

A carriage assembly 60 is mounted between the guide slots for vertical reciprocatory movement within the frame. The carriage assembly comprises a slide block 62 which is slidably mounted on a vertically extending guide shaft 64 by means of a bearing sleeve means 65. The guide shaft extends between, and is suitably connected to, the top plate 14 and the bottom plate 16. A link pin support bracket 66 is adjustably mounted on the slide block 62 by a plurality of fastening means 68 and key means 69. A link pin support housing 70 is fixedly secured to the lower end of the bracket 66 and retains a transversely extending link pin 72 in suitable bearing sleeve means 74. An L-shaped bracket 75 is suitably fastened to the slide block 62 for a purpose to be hereinafter described.

Figure 1:
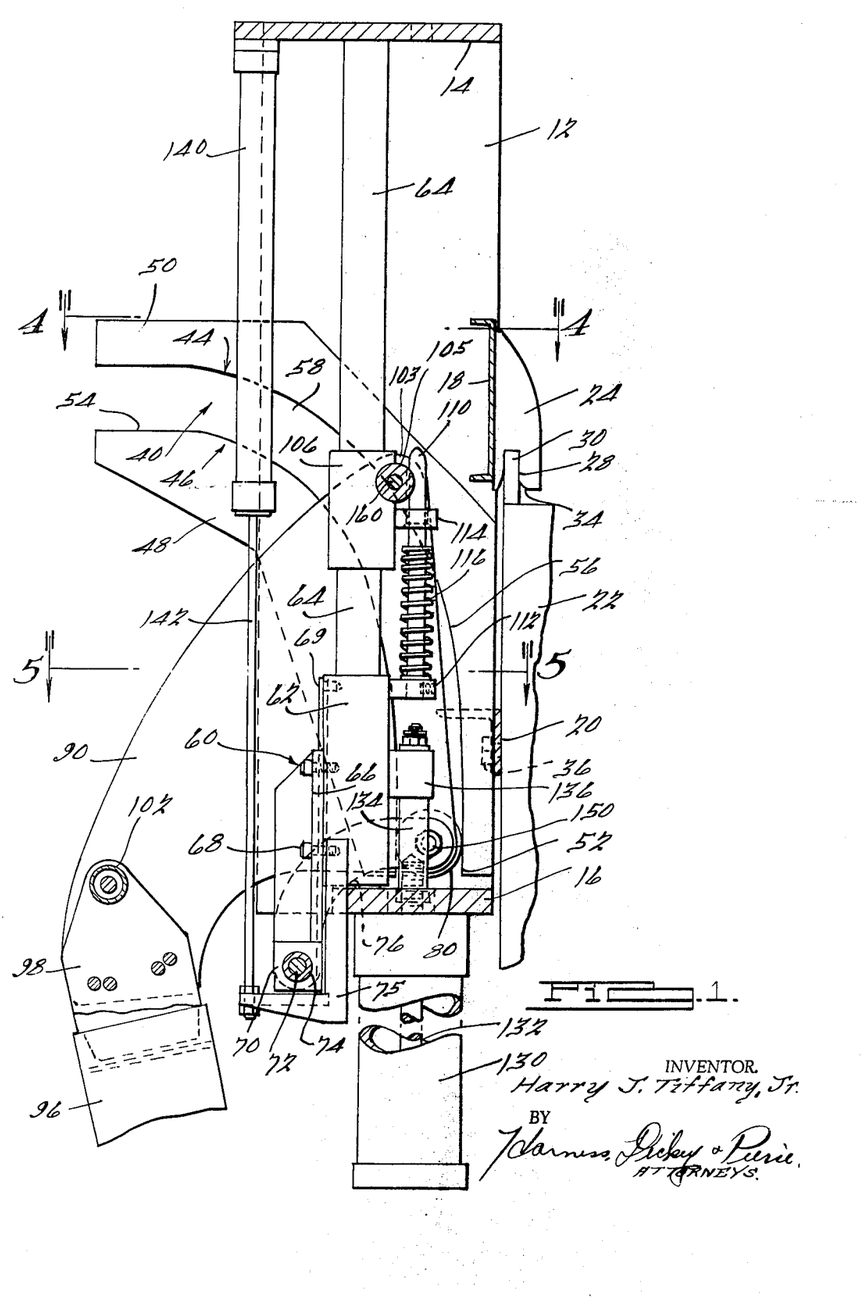
FIGURE 1 is a side elevational view, with parts removed, of an illustrative embodiment of the present invention in a retracted operational position.
Figure 5:
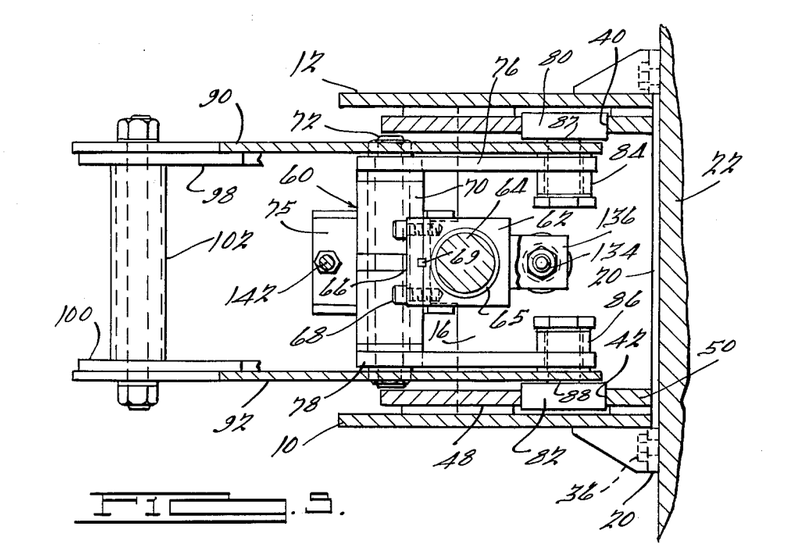
FIGURE 5 is a sectional view of all of the apparatus taken along the lines 5—5 in FIG. 1.

Referring now to FIGURE 5, a pair of curved links 76, 78 are pivotally mounted on the ends of the link pin 72. Cam follower means in the form of roller elements 80, 82 are rotatably mounted on the ends of the links 76, 78 by conventional retainer assemblies 84, 86. The rollers 80, 82 are adapted to be received in the guide slots and movably guided therealong. The roller retainer assemblies 84, 86 include stub shaft portions 87, 88 which extend through spaced support arm end plates 90, 92 so that movement of the rollers along the guide slots imparts corresponding movement to the support arm through the end plates. As shown in FIG. 1, the support arm end plates have a substantially triangular shape and downwardly extending support arm means 96 are connected to the outer ends thereof through coupling means comprising plate members 98, 100 (shown in FIG. 5) and a pin and bushing assembly 102. A jaw means (not shown) is mounted on the lower end of the support arm means 96 in a manner substantially as disclosed in United States Patent 2,609,776. The inner ends 103, 104 of the support arm end plates are connected by a pin and bushing assembly 105. A slide block 106 having a bearing sleeve means 108 is slidably mounted on the guide shaft 64 and is rigidly connected to the pin and bushing assembly 105 which permits pivotal movement of the support arm end plates relative thereto.

A return stroke assist means is associated with the guide blocks 62, 106 and comprises a vertically extending pin element 110 which is fixedly mounted on a flange 112 of the guide block 62 and extends upwardly therefrom through a suitable aperture in a flange 114 of the guide block 106. A compression spring element 116 is concentrically mounted on the pin 110 and is seated at its lower end on the flange 112. At certain times during the operation of the apparatus the upper end of the spring 116 seats on the bottom surface of the flange 114 and is compressed between the flanges 112, 114.

The carriage assembly 60 is reciprocable along the guide shaft 64 by means of a single acting fluid actuated cylinder 130 which is located beneath the frame in the preferred position permitting optimum power utilization and maximum efficiency in operation. The location of the cylinder in the preferred position is made possible by the particular arrangement of the support arm control means disclosed. A piston rod 132 extends upwardly through the bottom of the frame and is fixedly secured to the carriage assembly 60 through an adapter coupling 134 and a connecting block 136 fixedly secured to the slide block 62. A cushioning device for controlling return movement of the support arm is provided and comprises an oil cylinder 140, or the like, having a rod 142 attached to the carriage assembly through the L-shaped bracket 75 for reciprocable movement therewith. For illustrative purposes, the stroke of the cylinder 130 is shown to be sufficient to move the cam rollers 80, 82 substantially throughout the length of the cam slots 40, 42 in the illustrative embodiment. However, usually a cylinder having a shorter stroke sufficient to move the cam rollers along only a portion of the cam slots will be preferably used to provide a maximum variety of arm movement through sliding adjustment of the bracket 66 relative to the block 62.

In operation with the apparatus in the retracted position shown in FIG. 1, the piston rod 132 of the cylinder 130 is in a fully retracted position, the carriage assembly 60 is in its lowermost position, the roller means 80, 82 are located at the lower end of their travel along the cam slots 40, 42, and the support arm means 96 is located in its lowermost position relative to the press 22. In this position, the jaw means (not shown) on the lower end of the support arm means is located adjacent the confines of the press for actuation to grippingly engage a workpiece therewithin at a predetermined pickup point. It is to be noted that the roller means 80, 82 are located on the bottom of the vertical portion 52 of the cam slots.

Figure 7:
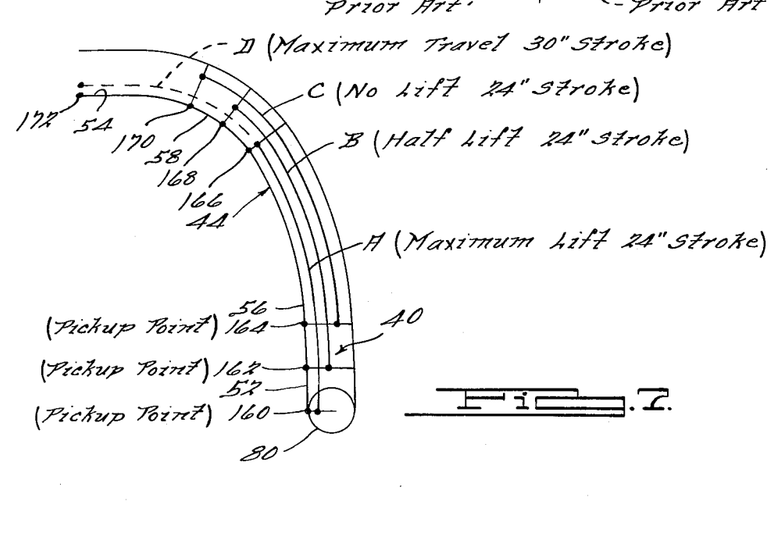
FIGURE 7 is a diagrammatic illustration of varying paths of movement of a pivot point of the workpiece support arm corresponding to the paths of movement of the workpiece shown in FIG. 6.

Referring now to FIG. 7, the initial lower or starting position of the central axis 150 of the rollers 80, 82 relative to the cam slots may be varied from a lowermost position indicated at 160 to any of a plurality of upwardly spaced initial positions 162, 164 by upward sliding adjustment of the bracket 66 relative to the slide block 62. In order to utilize the adjustable features of the invention, a piston stroke less than that needed to obtain movement over the entire cam slot surface is provided. If a piston rod stroke of 24 inches is being utilized, the path of movement of the central axis of the rollers will terminate at points 166, 168, 170 depending on the initial poistion. If a maximum stroke of 30 inches is utilized, the central axis 150 of the rollers will be moved from the initial position 160 to a terminal position 172 at the end of the cam slots.

It is assumed for purposes of illustrating the complete movement of the apparatus that a cylinder 130 having a maximum stroke of 30 inches which will produce movement throughout the length of the cam slots is being utilized. The length of the jaw support arm and the jaw means are adjustable, as disclosed in United States Patent 2,609,776, to obtain proper gripping engagement of the jaw means with the workpiece within the press. The jaw means are actuable in response to a signal generated at the completion of the stamping operation to grip the workpiece within the press. The cylinder 130 is then energized to cause extension of the piston rod 132. The position rod 132 moves upwardly and displaces the carriage assembly 60 by sliding movement of the slide block 62 on the guide shaft 64. The rollers 80, 82 follow the cam slots upwardly and guide movement of the jaw supporting arm and jaw means to cause movement of the workpiece along a path AD, shown in FIG. 6, which is initially totally vertical, as indicated at 176, to clear the workpiece from the die cavity. The movement of the workpiece is subsequently substantially horizontal as indicated at 178 and terminates in an upwardly and outwardly curving movement as indicated at 180. The corresponding movement of the central axis 150 of the rollers 80, 82, shown in FIG. 7, is initially totally vertical, as indicated at 52, and subsequently substantially vertical with increasing increments of horizontal movement as the rollers pass along the curved portions 56 of the cam slots. When the cam followers reach the curved portions 58 of the cam slots, the movement becomes substantially horizontal with decreasing increments of vertical displacement until the cam followers reach the horizontal portions 54 of the cam slots and thereafter the motion of the cam followers is entirely horizontal. Movement of the cam rollers over the entire cam surfaces 52 produces maximum lift of the workpiece out of the die cavity in the press at the beginning of the path of movement. Lift refers to the initial vertical movement of the workpiece. In general, the depth of the die cavity determines the amount of lift required to clear a particular workpiece from a press.

Assuming a 24 inch stroke, the bracket 66 is adjustable upwardly relative to the slide block 62 and the initial position of the cam rollers is thereby upwardly displaced along the cam track to vary the path of movement from a condition of maximum lift, as indicated by maximum lift line A, through a range of lift including the half-lift path line B and terminating with a no lift path line C. It will be understood that the designation "no lift" refers to a minimum lift condition. It is to be noted that neither the hook line or the pickup point changes and that a plurality of varying paths of movement are obtainable for a fixed pickup point. It will be understood by those skilled in the art to which this invention relates that the length of the jaw support arm and the position of the jaw means may also be adjusted if necessary for each adjustment of cam roller travel.

Figure 2:
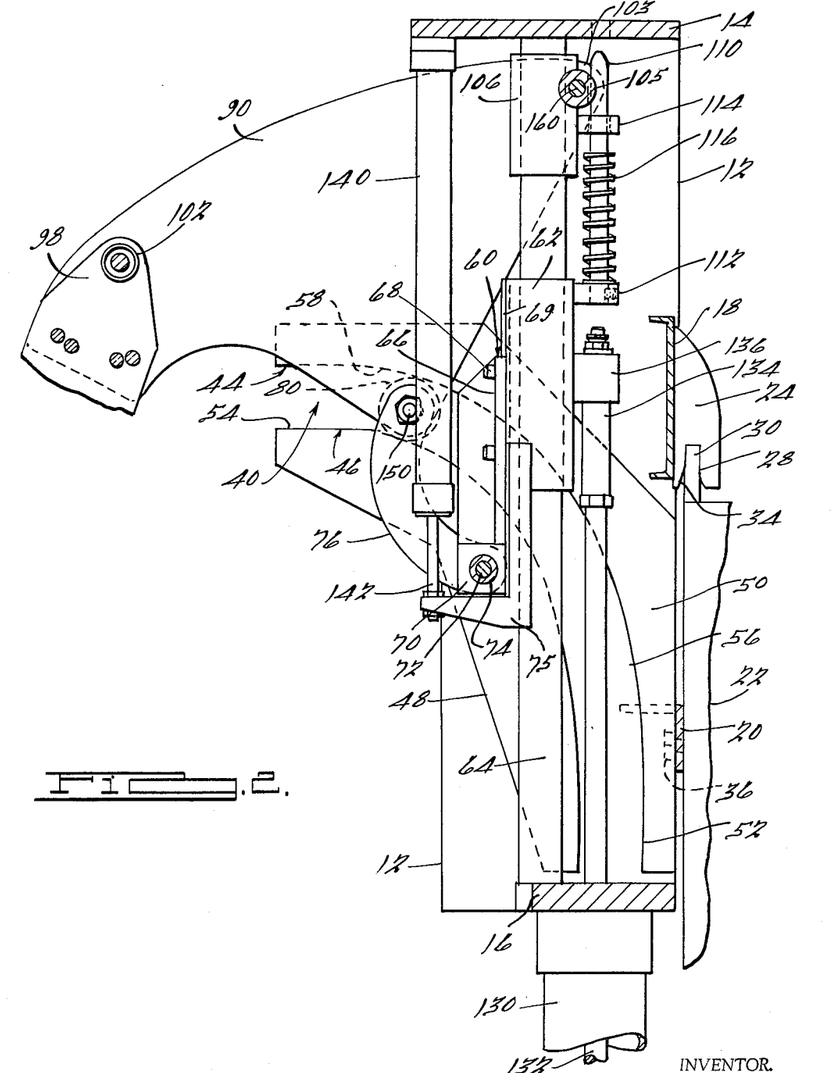
FIGURE 2 is a side elevational view, with parts removed, corresponding to FIGURE 1 and showing the apparatus in an intermediate operational position.
Figure 3:
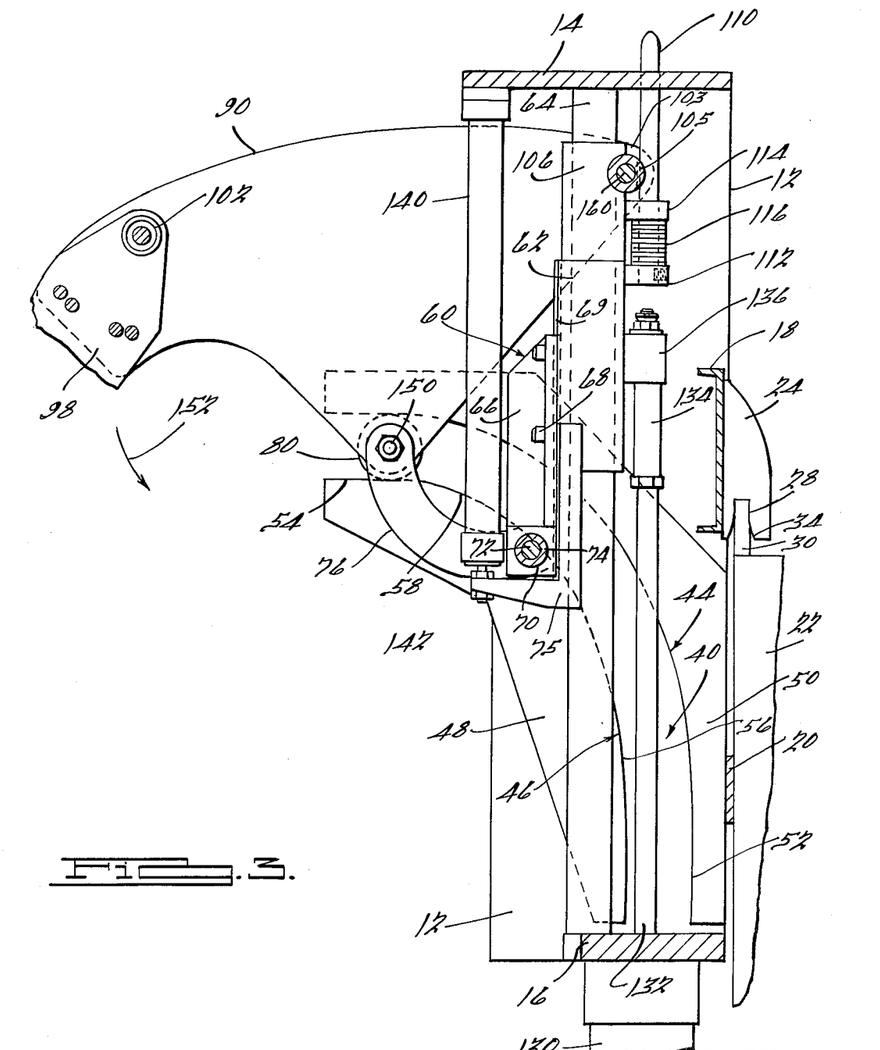
FIGURE 3 is a side elevational view, with parts removed, corresponding to FIGS. 1 and 2 and showing the apparatus in an extended operational position.
Figure 4:
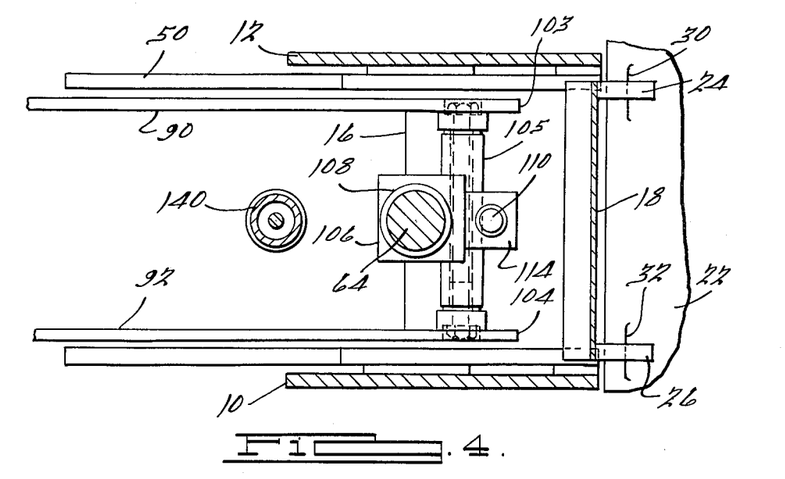
FIGURE 4 is a sectional view of all of the apparatus taken along the line 4—4 of FIG. 1.

During the upper movement of the carriage assembly, the support arm means 96 including the arm end plates 90, 92 are pivoted about the axis 150 and the central axis 160 of the pivotal connection 105. The slide block 106 moves upwardly on the guide shaft 64 to a maximum vertical position shown in FIG. 2 and then downwardly toward the upwardly moving block 62, and confines movement of the support arm means to a predetermined path provided by the cam slots. The downward movement continues during the latter stages of the movement of the support arm from the retracted position to the extended position until the position shown in FIG. 3 is attained. The compression spring 116 which is seated between the flanges 112, 114 is thus compressed. Consequently, energy is stored by the spring for initiation of the return stroke.

At the completion or at some predetermined point before completion of the outward movement of the support arm, a signal is generated which actuates conventional valve means (not shown) in a conventional manner to actuate the jaw means and release the workpiece. The rod 142 is freely carried upwardly within the return cylinder 140 during movement of the arm from the retracted to the extended position. At the end of the upward movement, the cylinder 130 is exhausted to the atmosphere and the weight of the arm is supported by fluid trapped in the cylinder 140 beneath a piston on the end of the rod 142 and the flat horizontal surfaces 54 of the cam slots. In order to assist return movement of the support arm means to the retracted position, energy storage means, illustrated in the form of the spring element 116, have been provided. The spring element 116 is conditioned by compression during power movement of the support arm means to the extended position to provide an assist force to initiate subsequent support arm retraction. The cylinder 140 is provided with orifice controlled bypass means to permit the fluid trapped therein to be bled at a controlled rate from beneath the piston and permit extension of the rod 142 by the weight of the support arm 96. Because of the position of the rollers 80, 82 and the pivoted axis of the support arm in the extended position, the force of gravity may be insufficient to initiate the return movement. However, the compressed spring 116 exerts a force between the slide block 62 and the slide block 106 which causes sliding movement thereof along the guide shaft 64. As the carriage assembly moves down the guide shaft 64, the link pin 72 is carried downwardly and drags the roller means 80, 82 off the horizontal portions 54 of the cam slots onto the curved portions 58. When the cam follower means 80, 82 reach the curved portions 58 of the cam slots, the force of gravity on the support arm means will sustain further movement down the curved slots as the cylinder 140 is bled, and will be sufficient to move the support arm means from the extended position to the retracted position shown in FIG. 1. In the retracted position, the support arm 96 extends downwardly and inwardly toward the press 22 and the roller means 80, 82 are located at the initial position in the cam slots 40, 42. In the retracted position, the jaw means carried by the support arm means will be located adjacent the confines of the press in a position for actuation to grippingly engage the workpiece in the press.

Figure 6:
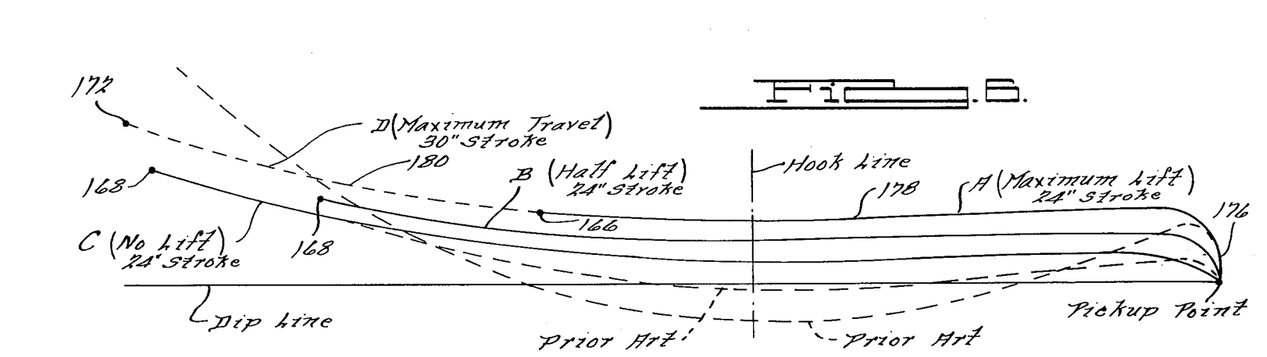
FIGURE 6 is a diagrammatic illustration of some of the varying paths of movement of a workpiece from a single pickup point obtainable with the present apparatus.

Lines A, B and C in FIG. 6 represent workpiece paths of movement for a 24 inch stroke cylinder corresponding to initial settings 160, 162, 164 of the roller means indicated in FIG. 7. The apparatus is obviously capable of producing an infinite number of variable paths of movement depending on the stroke of the cylinder and the initial setting of the roller means. Since it would be impossible to concisely illustrate all possible paths, a maximum travel path AD produced with a maximum stroke cylinder has been illustrated in FIGS. 1–5, and a plurality of shorter paths A, B, and C produced with a cylinder of lesser stroke and with variable adjustment of the bracket 66 relative to the slide block 62 have been illustrated diagrammatically in FIGS. 6 and 7. One of the primary advantages of the present invention is the provision of a workpiece travel path in which "dip" is greatly improved. As shown in FIG. 6, the paths A, B and C have substantially level intermediate portions which do not approach the dip line and do not fall below the pickup point. The prior art path of movement curves illustrate arcuate intermediate portions which approach and often fall below the pickup line. Unless the path of movement is closely controlled to eliminate dip, undesirable engagement between the workpiece and the press may result.

The present invention provides an improved work handling device having particular utility and producing improved results in the environment disclosed. However, the invention may obviously be adapted by incorporating the inventive principles herein disclosed to other uses in alternative embodiments. For example, it should be noted that the movement of the support arm means may be reversed if desired so that the normal position would be the upper outer position and the travel cycle thereof would be down into the press and back to the upper position rather than away from the press to the upper position and back to the lower position adjacent the press. Consequently, it is intended that the scope of the appended claims include those modifications and variations of the invention which obtain equivalent results by the application of the inventive principles hereinbefore disclosed.

The invention claimed is:

1. In a material handling device having a jaw arm movable from a normal lowered retracted position relative to a press to a raised extended position, cam track means guiding movement of said jaw arm and having a substantially horizontally extending terminal portion, cam means movably supporting said jaw arm for movement between said retracted position and said extended position, power means for actuating said jaw arm from said lowered retracted position to said raised extended position, energy storage means operative upon movement of said jaw arm from said retracted position to said extended position and conditioned thereby, and said energy storage means being operative to initiate movement of said jaw arm from said raised extended position to a point where the force of gravity will be operative upon said jaw arm to move said jaw arm from said extended position to said retracted position without use of additional power means.

2. A press unloader comprising a swingable jaw arm movable between a retracted upwardly outwardly located position and an extended downwardly inwardly located position relative to a press, a pair of vertically spaced pivotal connections provided on the upper end of said swingable jaw arm, a frame for supporting said swingable jaw arm, a cam track associated with said frame and extending from a lowermost point to a vertically upwardly and outwardly spaced uppermost point, cam follower means mounted for guided movement along said cam track, link means pivotally connected to said cam follower means and to one of said pair of pivotal connections, drive means associated with said link means to drive said cam follower means and said one of said pair of pivotal connections along said cam track whereby said swingable jaw arm is moved by force applied through said one of said pivotal connections, vertically extending guide means associated with said frame, slide means slidably mounted on said guide means, and the other one of said pivotal connections being connected to said slide means and movable therewith only along said guide means whereby substantially all of the path of upward movement of said swingable jaw arm is confined to components of motion away from said press.

3. The invention as defined in claim 2 and wherein adjustment means are provided to vary the location of said cam follower means relative to said cam track and to thereby vary the path of movement of said swingable jaw arm.

4. In a material handling device having a jaw arm pivoted for movement between an extended inwardly downwardly located position and a retracted upwardly outwardly located position relative to a press, power means for actuating said jaw arm between said extended position and said retracted position, vertically extending guide shaft means, a guide sleeve pivotally fixed to said jaw arm and slidably received on said guide shaft means, carriage means slidably mounted on said guide shaft means and being pivotally connected to said jaw arm to impart movement thereto, said power means being connected to said carriage means for reciprocable actuation thereof along said guide shaft means, said carriage means and said guide sleeve means being vertically spaced on said guide shaft means, and spring means mounted between said carriage means and said guide sleeve means and being compressible therebetween during movement of said jaw arm between said extended position and said retracted position to thereby store energy releasable to initiate movement of the jaw arm from said retracted position to said extended position to overcome the inertia of said jaw arm and move said jaw arm to a position whereat the force of gravity is operative to move said jaw arm from said retracted position to said extended position.

5. A press unloading device comprising a swingable jaw supporting arm movable between a retracted upwardly outwardly located position and an extended downwardly inwardly located position relative to a press, spaced separately movable and variably displaceable slide means supporting said swingable jaw supporting arm, a first pivot means for said swingable jaw supporting arm pivotally connecting said swingable jaw supporting arm to one of said spaced slide means, and a second pivot means for said swingable jaw supporting arm pivotally connecting said swingable jaw supporting arm to the other of said spaced slide means, and power cylinder means connected to said swingable jaw supporting arm through one of said pivot means to drive said swingable arm between the extended downwardly inwardly located position and the retracted upwardly outwardly located position said power cylinder means serving to displace said slide means vertically as said swinging arm moves between said upwardly outwardly located position and said downwardly inwardly located position.

6. A press unloading device comprising a swingable jaw supporting arm, frame means for supporting said arm, pivotal support means mounting said arm on said frame means for swinging movement relative thereto, power cylinder means mounted on said frame means and connected to said arm for swinging said jaw supporting arm, guide shaft means mounted on said frame means, slide means slidably mounted on said guide shaft means, link means pivotally connected at one end to said jaw supporting arm and at the other end to said slide means, and adjustable connecting means provided between and connecting said slide means and said link means to variably position said link means relative to said slide means to obtain varying paths of movement of said jaw supporting arm.

7. A press unloading device comprising a swingable jaw supporting arm movable between a lowered position and a raised position relative to a press, frame means for supporting said jaw supporting arm and for mounting said press unloading device on a press, vertically extending guide shaft means mounted on said frame means, spaced separately movable and variably displaceable slide means mounted on said guide shaft means, an upper portion of said jaw supporting arm being pivotally connected to the uppermost one of said slide means, cam follower means pivotally connected to a lower portion of said jaw supporting arm, cam track means having a lower vertical portion and an upper horizontal portion connected by an upwardly outwardly curved portion and guidably receiving said cam follower means, link means pivotally connected to said jaw supporting arm adjacent said cam follower means, an adjustable connection between said link means and the lower one of said slide means to permit the location of said cam follower means on said cam means relative to the lower one of said slide means to be varied to obtain variable paths of movement of said jaw supporting arm, power cylinder means fixedly mounted on said frame means below said slide means, and actuating means extending upwardly from said power cylinder means and being drivingly connected to the lower one of said slide means.

8. The invention as defined in claim 7 and wherein said power cylinder means is single acting upwardly to drive said jaw supporting arm upwardly from the lowered position to the raised position, and release means operable in the raised position to cause return movement of said jaw supporting arm from the raised position to the lowered position by the force of gravity.

9. The invention as defined in claim 8 and including spring means mounted between said slide means and being compressible therebetween during upward movement of said jaw supporting arm to the raised position and operable in the raised position to apply a return force causing movement of the jaw supporting arm downwardly to a position whereat the force of gravity is effective to cause return movement to the lowered position.

10. A press unloading device comprising a swingable jaw supporting arm movable between a lowered position and a raised position relative to a press, frame means for supporting said jaw supporting arm and for mounting said press unloading device on a press, vertically extending guide shaft means mounted on said frame means, spaced separately movable and variably displaceable slide means mounted on said guide shaft means, an upper portion of said jaw supporting arm being pivotally connected to the uppermost one of said slide means, cam follower means pivotally connected to a lower portion of said jaw supporting arm, cam track means guidably receiving said cam follower means, link means pivotally connected to said jaw supporting arm adjacent said cam follower means, adjustable connecting means between said link means and the lower one of said slide means to permit the location of said cam follower means on said cam means relative to the lower one of said slide means to be varied to obtain variable paths of movement of said jaw supporting arm, power cylinder means fixedly mounted on said frame means, and actuating means extending from said power cylinder means and being drivingly connected to the lower one of said slide means.

11. A press unloader comprising a swingable jaw supporting arm movable between an upwardly outwardly located position and a downwardly inwardly located position relative to a press, spaced pivotal connections provided on the upper end of said supporting jaw arm, a frame for supporting said jaw supporting arm, cam track means associated with said frame and extending from a lowermost point to a vertically upwardly spaced uppermost point, cam follower means on said jaw supporting arm for guiding movement along said cam track means, link means pivotally connected to said jaw supporting arm and forming one of said pair of pivotal connections, drive means associated with said link means to drive said jaw supporting arm between said upwardly outwardly located position and said downwardly inwardly located position and move said cam follower means along said cam, vertically extending guide means associated with said frame, slide means slidably mounted on said guide means, and the other one of said pivotal connections being connected to said slide means and movable therewith along said guide means.

12. The device as defined in claim 5 and having link means drivably connecting said power cylinder means to said jaw supporting arm.

13. In a work handling device for moving a swingable jaw supporting arm between a raised position and a lowered position relative to a press or the like, first and second spaced separately movable and variably displaceable pivot means pivotally supporting said jaw supporting arm for movement between said positions, power means for actuating said jaw supporting arm between said positions, cam means for guiding one of said pivot means on said jaw supporting arm along a confined path, and guide means for controlling movement of the other of said pivot means on said jaw supporting arm so as to move said jaw supporting arm from a workpiece pick-up point in the lowered position to a workpiece release point in the upper position and confining movement to a path extending generally upwardly and then outwardly relative to said press and always lying above a horizontal line extending through the pick-up point and having an initial substantially totally vertical displacement from the pick-up point and a subsequent substantially horizontal displacement to clear the press.

14. In a material handling device having a jaw supporting arm movable from a lowered position relative to a press to a raised position, cam track means guiding movement of said jaw supporting arm and having a substantially horizontally extending terminal portion, cam means movably supporting said jaw supporting arm on said cam track means for movement between said lowered position and said raised position and being located on said horizontally extending terminal portion in the raised position, power means for actuating said jaw supporting arm from said lowered position to said raised position, energy storage means operative upon movement of said jaw supporting arm from said lowered position to said raised position and conditioned by such movement, and said energy storage means being operative to assist movement of said cam means from said substantially horizontally extending terminal portion of said cam track means during movement of said jaw supporting arm from said raised position to a point where the force of gravity will be operative upon said jaw supporting arm to cause movement thereof from the raised position to the lowered position without use of additional power means.

15. In a press unloading device, a swingable arm mounted for swinging movement between spaced positions and adapted to carry jaw means for gripping and carrying workpieces during movement of said swingable arm between said spaced positions, frame means for supporting said swingable arm, cam track means on said frame means for guiding movement of said swingable arm, cam means on said swingable arm moveable along said cam track means, power means for moving said swingable arm between said spaced positions, and connecting means connecting said swingable arm to said power means including path adjustment means selectively movable between a plurality of positions to vary the position of said cam means on said cam track means to enable said jaw means to travel along different paths at each different adjusted position of said path adjustment means.

16. In a work handling device for moving a jaw supporting arm between a raised position and a lowered position relative to a press or the like, frame means fixedly mounting said device relative to the press, support means for said jaw supporting arm fixedly mounted relative to said frame means including curvilinear cam track means and rectilinear slide means, cam follower means rotatably mounted on said jaw supporting arm and being rollably supported on said cam track means for movement therealong during movement of said jaw supporting arm between the raised position and the lowered position, a first pivotal connection between said jaw supporting arm and said slide means and defining a first pivotal axis for said jaw supporting arm, power cylinder means mounted on said frame means and being operable to move said jaw supporting arm between the lowered position and the raised position, piston rod means movable rectilinearly by said power cylinder means, carriage means mounted on said slide means and connected to said piston rod means, link means connecting said carriage means to said jaw supporting arm whereby displacement of said cam follower means along said cam track means may be effectuated at a rate faster than the rate of rectilinear movement of said piston rod, slidable means mounted on said slide means for rectilinear movement therealong, a second pivotal connection between said jaw supporting arm and said slidable means, a lower substantially vertically extending portion on said cam track means adapted to impart substantially vertical initial displacement to said jaw supporting arm during movement from said lowered position to said raised position, an intermediate curvilinear portion on said cam track means adapted to impart substantially horizontal movement to said jaw supporting arm, and an upper substantially horizontally extending portion on said cam track means arranged and positioned to maximize horizontal displacement of said jaw supporting arm, said cam track means causing said second pivotal connection to be moved upwardly with said slidable means on said slide means during initial and intermediate movement of said jaw supporting arm and to be moved downwardly on said slidable means during final movement of said jaw supporting arm as said cam follower means reaches said horizontally extending portion and moves therealong during the terminal portion of movement of said jaw supporting arm from the lowered position to the raised position.

17. In a material handling device having a jaw supporting arm movable between a lowered position and a raised position relative to a press or the like, cam track means for guiding movement of said jaw supporting arm, cam follower means movably supporting said jaw supporting arm on said cam track means, power means for actuating said jaw supporting arm from the lowered position to the raised position, vertically extending guide shaft means, guide sleeve means pivotally fixed to said jaw supporting arm and slidably received on said guide shaft means, carriage means slidably mounted on said guide shaft means and being pivotally connected to said jaw supporting arm, said power means being connected to said carriage means for reciprocable actuation thereof along said guide shaft means to impart movement to said jaw supporting arm, said carriage means and said guide sleeve means being vertically spaced on said guide shaft means, and spring means associated with said guide sleeve means and being compressible during movement of said jaw arm from said lowered position to said raised position to thereby store energy releasable to initiate movement of the jaw supporting arm from said raised position to said lowered position to overcome the energy of said jaw supporting arm and move said jaw supporting arm to a position whereat the force of gravity is operative to move said jaw supporting arm from the raised position to the lowered position.

References Cited by the Examiner

UNITED STATES PATENTS

| | | |
|---|---|---|
| 1,296,818 | 3/19 | La France. |
| 2,609,776 | 9/52 | Sahlin. |
| 2,646,897 | 7/53 | Francisco. |
| 2,677,342 | 5/54 | Miller. |
| 2,943,748 | 7/60 | Sahlin. |
| 3,040,685 | 6/62 | Ridley. |

HUGO O. SCHULZ, *Primary Examiner.*